(12) United States Patent
Costalat

(10) Patent No.: US 12,478,378 B2
(45) Date of Patent: Nov. 25, 2025

(54) INTRA-ANEURYSMAL DEVICE

(71) Applicants: CENTRE HOSPITALIER ET UNIVERSITAIRE DE MONTPELLIER, Montpellier (FR); UNIVERISTE DE MONTPELLIER, Montpellier (FR); SATT AXLR, Montpellier (FR)

(72) Inventor: Vincent Costalat, Saint Gely du Fesc (FR)

( * ) Notice: Subject to any disclaimer, the term of this patent is extended or adjusted under 35 U.S.C. 154(b) by 0 days.

(21) Appl. No.: 16/477,173

(22) PCT Filed: Jan. 11, 2018

(86) PCT No.: PCT/EP2018/050698
§ 371 (c)(1),
(2) Date: Jul. 10, 2019

(87) PCT Pub. No.: WO2018/130624
PCT Pub. Date: Jul. 19, 2018

(65) Prior Publication Data
US 2019/0343533 A1    Nov. 14, 2019

(30) Foreign Application Priority Data
Jan. 11, 2017    (FR) ...................................... 1750227

(51) Int. Cl.
*A61B 17/12* (2006.01)
*A61B 17/00* (2006.01)
*A61B 90/00* (2016.01)

(52) U.S. Cl.
CPC .. *A61B 17/12118* (2013.01); *A61B 17/12031* (2013.01); *A61B 17/12172* (2013.01);
(Continued)

(58) Field of Classification Search
CPC ........ A61B 17/12113; A61B 17/12118; A61B 17/12109; A61B 17/1203
See application file for complete search history.

(56) References Cited

U.S. PATENT DOCUMENTS

2009/0143786 A1* 6/2009 Bashiri ............ A61B 17/12022
606/1
2009/0287291 A1* 11/2009 Becking ........... A61B 17/12113
623/1.11
(Continued)

FOREIGN PATENT DOCUMENTS

WO    WO 2006/052322 A2    5/2006
WO    WO 2008/151204 A1    12/2008

OTHER PUBLICATIONS

International Search Report of corresponding PCT/EP2018/050698, dated Apr. 9, 2018, 4 pages, 3 pages English translation.
(Continued)

*Primary Examiner* — Katherine Shi
*Assistant Examiner* — Mohammed S Adam
(74) *Attorney, Agent, or Firm* — Patshegen IP; Moshe Pinchas

(57) ABSTRACT

Intra-aneurysmal device (1) for the treatment of an aneurysm (2), this device (1) comprising:
  a stent (3) with an approximately circular section with diameter (D1), the stent (3) being suitable for and designed to anchor the device (1) in an artery,
  a head (5) designed to be inserted in the aneurysm (2), the head (5) being capable of significantly reducing blood flow in the aneurysm (2),
  an intermediate portion (4) located between the head (5) and the stent (3), and connecting the head (5) to the stent (3), (Continued)

wherein the intermediate portion (4) is in the form of an ellipsoid, of which a distal end (11) is connected to the head (5) and a proximal end (12) is connected to the stent (3).

14 Claims, 6 Drawing Sheets

(52) U.S. Cl.
CPC .... *A61B 90/39* (2016.02); *A61B 2017/00477* (2013.01); *A61B 2017/12063* (2013.01); *A61B 2090/3966* (2016.02)

(56) References Cited

U.S. PATENT DOCUMENTS

| | | |
|---|---|---|
| 2010/0023105 A1 | 1/2010 | Levy et al. |
| 2012/0172927 A1* | 7/2012 | Campbell ........ A61B 17/12172 606/213 |
| 2012/0296362 A1 | 11/2012 | Cam et al. |
| 2015/0272589 A1* | 10/2015 | Lorenzo ........... A61B 17/12145 606/200 |
| 2017/0231640 A1* | 8/2017 | Furey ..................... B21F 27/02 606/200 |

OTHER PUBLICATIONS

Written Opinion of the International Searching Authority corresponding to PCT/EP2018/050698, dated Apr. 9, 2018, 6 pages.

\* cited by examiner

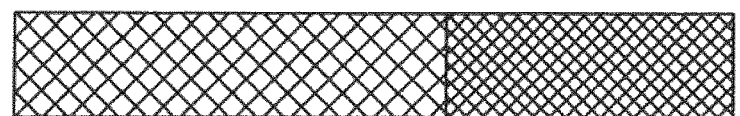
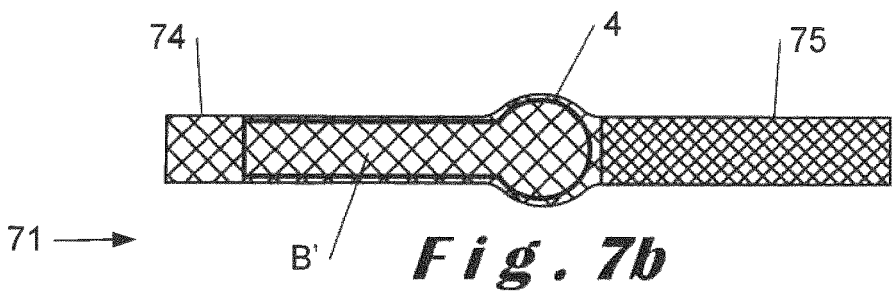
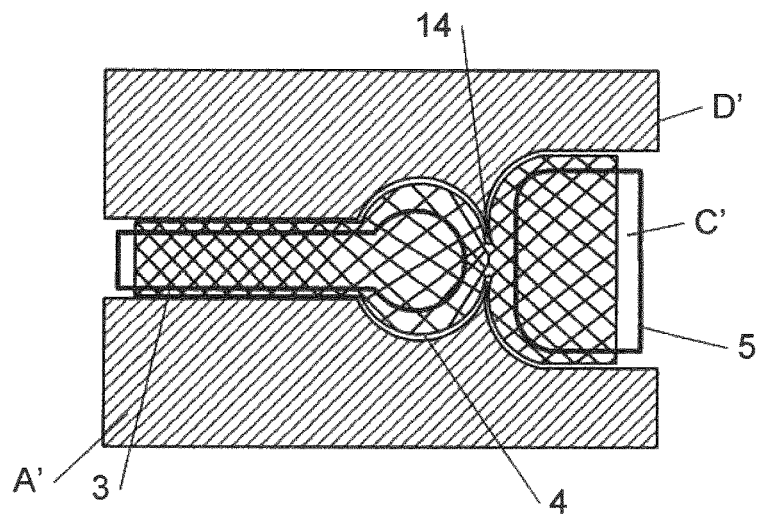
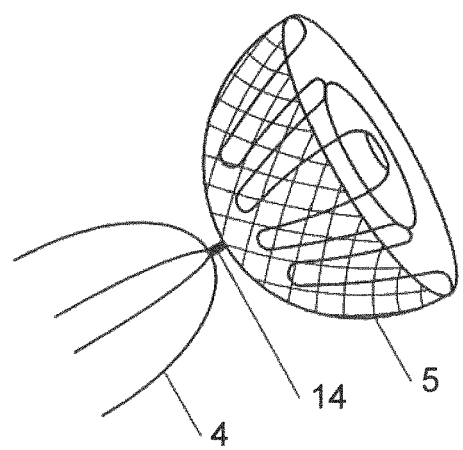

INTRA-ANEURYSMAL DEVICE

CROSS-REFERENCE TO RELATED APPLICATION(S)

This application is a National Phase Patent Application of International Application Number PCT/EP2018/050698, filed on Jan. 11, 2018, which claims priority to French Patent Application Number 1750227, filed on Jan. 11, 2017, the entire contents of both of which are incorporated herein by reference.

The invention relates to the field of intra-aneurysmal medical devices. More precisely, the invention relates to intra-aneurysmal devices with flow diversion.

"Aneurysm" means a dilation of the wall of an artery. The dilation causes an aneurysmal sac that communicates with the artery through a narrowed zone known to practitioners as a "neck".

Rupture of an aneurysm, or more precisely the aneurysmal sac, can have serious consequences, up to death. Aneurysms are caused by several factors. It should be noted that prevalence is higher in elderly persons. The risk of rupture in these persons is also higher, particularly due to related pathologies such as high blood pressure that result in an increase in arterial blood pressure.

Consequently, it is a public health problem that needs to be treated. There are several treatment techniques.

One of the techniques is called "endovascular" and includes a step to treat the aneurysm using an intra-aneurysmal device. An extra-aneurysmal or intra-aneurysmal device, or both, can also be used. In this case, the aneurysm is approached following the path of the arteries. A carrier catheter (carrying an intra-aneurysmal device) is introduced through the arteries and directed under radioscopic control. The device is then deposited in the aneurysm. In particular, the device is deposited in the artery carrying the aneurysm in the case of an extra-aneurysmal device or in the aneurysm in the case of an intra-aneurysmal device. This isolates the aneurysm from the blood flow of the artery so that the aneurysmal sac will not rupture under the effect of blood pressure.

Intra-aneurysmal devices are known in the medical field. The international application published under number WO 2006/052322 describes an intra-aneurysmal device aimed at securing the implantation of "coils". The term "coils" refers to a small turn of metal used to close off a vessel. Many intra-aneurysmal devices use coils to fill the aneurysmal sac of the aneurysm to be treated so as to limit the blood flow towards the aneurysm. However, these coils can form a danger because they can inadvertently be positioned in the source artery (consequently hindering the blood flow), and they can also move over time from the aneurysm to the source artery (also hindering blood circulation). Despite the fact that this document WO 2006/052322 discloses a device aimed at securing the insertion of coils, this device has many disadvantages, particularly due to the use of coils, both for patients and for practitioners. The use of coils is an inherently difficult treatment for the practitioner.

In this document, the device comprises a stent that anchors the device in a source artery, carrying the aneurysm. The term stent is currently used in the medical field to denote a tube with an approximately circular section. Anchorage is made by endothelialisation of the stent on the internal wall of the artery. The device comprises a head, generally in the form of a dome that will be housed inside the aneurysmal sac. The device comprises a thinned intermediate portion between the dome and the stent, through which the blood flow passes.

One disadvantage is that this device cannot treat all types of aneurysm. Some aneurysms are said to be "wide neck" aneurysms. A wide neck aneurysm is a difficult anatomical situation that corresponds to a particularly wide entry. The stability of endovascular treatments is often difficult with this type of aneurysm. The dome is not stable and can move inside the aneurysmal sac over time, or even worse can escape from it, which in the best of cases will render the device useless and in the worst case can cause complications for the patient. A wide neck does not provide the dome with the support area (or contact area) necessary for the dome to remain in the aneurysmal sac for a long period. Thus, this device cannot treat a wide neck aneurysm efficiently because it would not be stable and could be inefficient or even dangerous for the patient, particularly in the long term.

Another disadvantage of this device is that it can require the use of coils. Consequently, it is necessary to use an additional tool to put the coils in position in the aneurysm once the device has been installed in the patient. This can extend the placement time and require more operations to be performed by the practitioner, to the detriment of the patient's safety.

Another disadvantage is that this device has long term weaknesses for all types of aneurysms. Its architecture is such that it cannot provide a long term anchorage.

Furthermore, this device comprises an intermediate part with a thrombogenic nature. The wires that make the connection between the anchorage stent and the half-dome occupy a significant space at the centre of the artery carrying the aneurysm. This meshed structure then forms an ideal location for local endothelialisation and consequently a thrombosis in the carrier artery.

A first object is to provide an intra-aneurysmal device that can be adapted to any type of aneurysm and particularly wide neck aneurysms.

A second object is to provide an intra-aneurysmal device that does not require the addition of any supplementary equipment inside the aneurysm (coils).

A third object is to provide an intra-aneurysmal device with good stability regardless of the form of the aneurysm.

A fourth object is to provide a device that is stable when it is used to treat an aneurysm located in the vicinity of an arterial bifurcation.

A fifth object is to provide a device with an anchorage that is more stable in the long term than existing devices.

A sixth object is to provide an ergonomic device for the practitioner.

For this purpose, in the first place there is proposed an intra-aneurysmal device for the treatment of an aneurysm, this device comprising:
  a stent with an approximately circular section, the diameter being such that the stent is suitable for and designed to anchor the device in an artery,
  a head designed to be inserted in the aneurysm, the head being capable of significantly reducing blood flow in the aneurysm,
  an intermediate portion located between the head and the stent, and connecting the head to the stent, in which the intermediate portion is in the form of an ellipsoid, of which the distal end is connected to the head and a proximal end is connected to the stent, and in which a transverse diameter of the intermediate portion is larger or much larger than the diameter of the stent, the transverse diameter being approximately perpendicular to a longitudinal axis of the device and in which the intermediate portion and the head are connected by a node such that the head is free to move relative to the intermediate portion.

This device is easily adapted to any type of aneurysm. In particular, it can be used to treat wide neck aneurysms due to its ellipsoid shaped intermediate portion and its diameter being larger than the diameter of the stent. This geometry can also advantageously improve the stability of the intra-aneurysmal device regardless of the form of the aneurysm and particularly an aneurysm located in the vicinity of an arterial bifurcation. Furthermore, the intermediate portion with the stent can make an anchorage stable in the long term.

Various other characteristics can be included alone or in combination:
- the head is in the form of a dome;
- the head is concave around its centre, the concave part facing the intermediate portion;
- the intermediate portion continuously prolongs the stent;
- the head is composed of at least one wire forming an appropriate mesh and is designed to divert a large proportion of the blood flow;
- the head comprises between eight and two hundred wires and preferably between thirty-two and two hundred wires;
- the stent and/or the intermediate portion are made using at least one wire forming a mesh that enables blood flow through the stent and the intermediate portion;
- the shape of an external wall of the head facing the intermediate portion is approximately the corresponding shape to an upper wall of the intermediate portion;
- the wires are made of a biocompatible material, preferably nitinol, platinum or titanium
- at least one wire is radio-opaque;
- the device comprises an annular ring located on one end of the stent;
- the device comprises a second flexible annular ring located between the head and the intermediate portion;
- the annular ring and the second annular ring are fabricated from a radio-opaque material;
- the rings are fixed by crimping.

Other special features and advantages of the invention will become clear from the description given below with reference to the appended drawings, given as non-limitative examples and in which.

Figure 4:
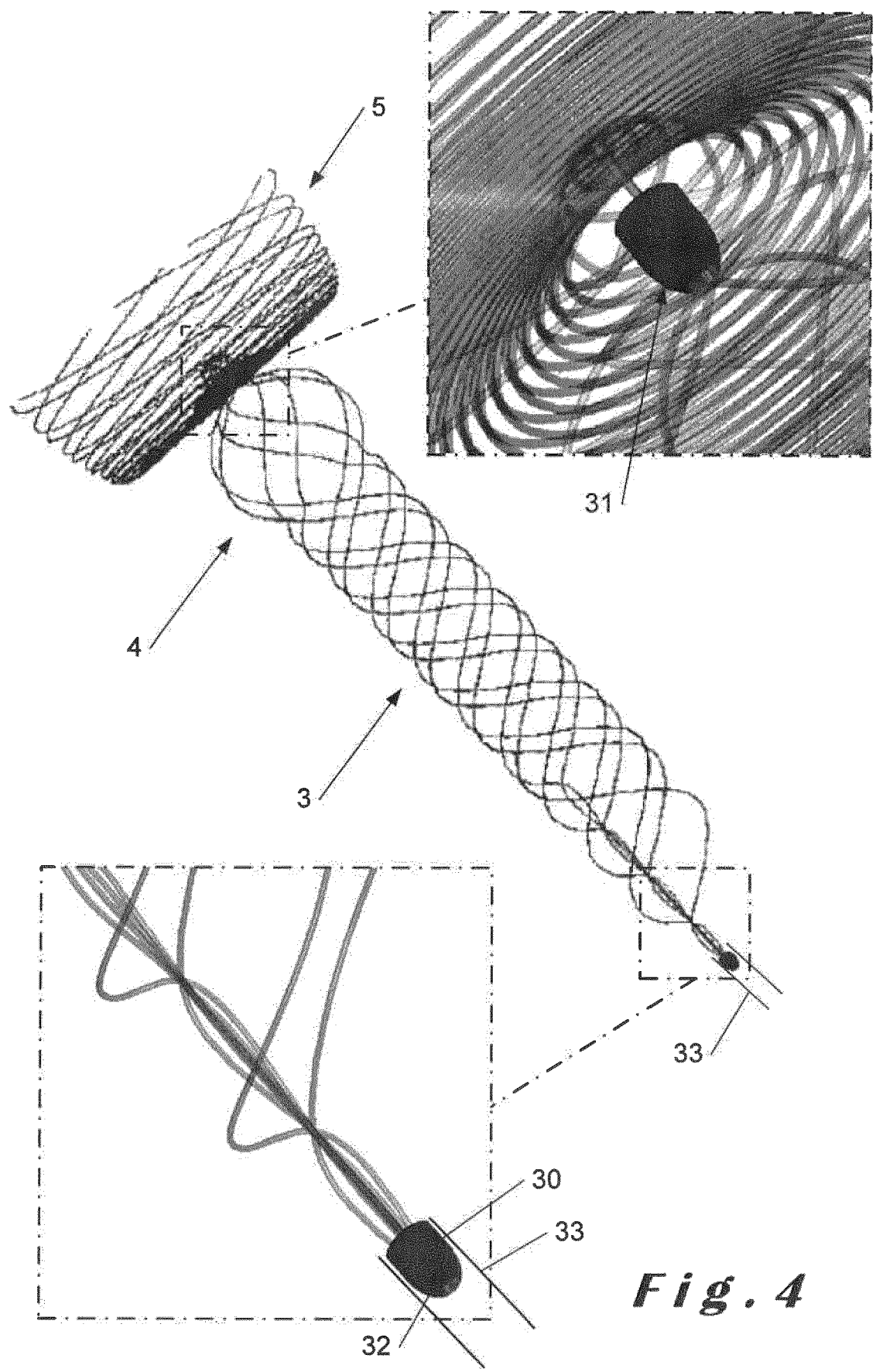
Figure 6A:
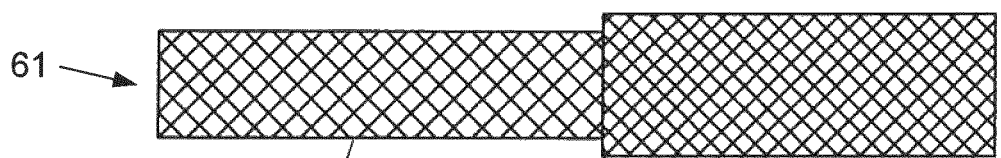
Figure 6B:
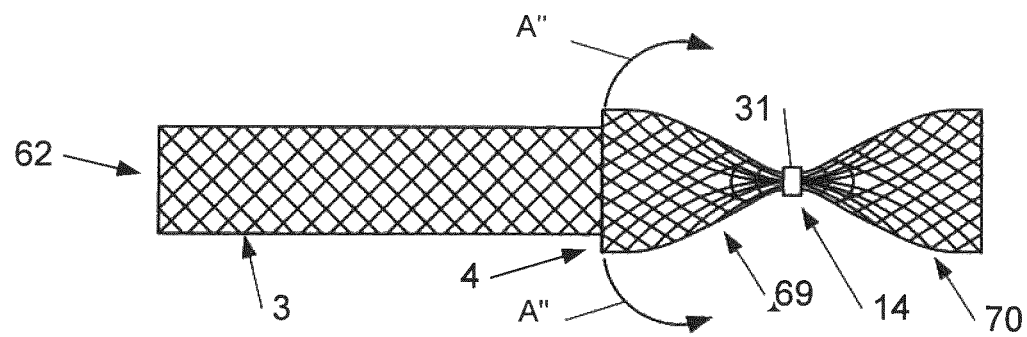
Figure 6C:
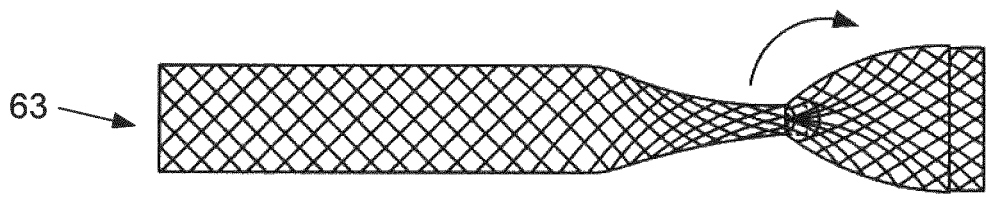
Figure 6D:
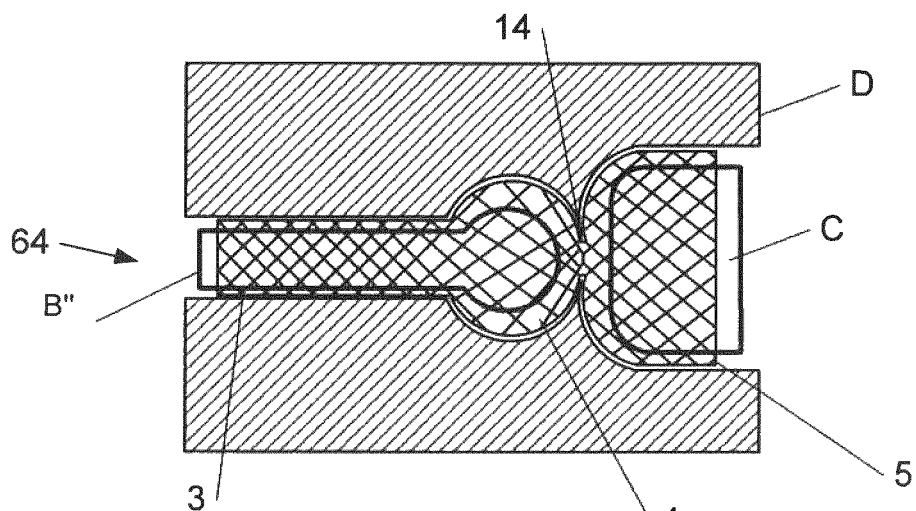

FIG. 4 comprises several perspective views of the device according to one variant embodiment.

Figure 5:
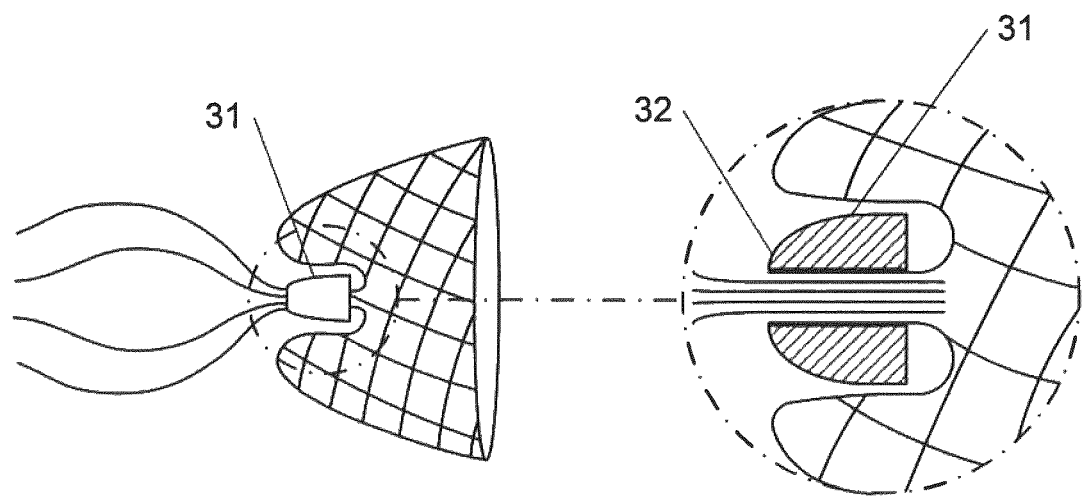

FIG. 5 is a sectional view of a second ring:

FIGS. 6a, 6b, 6c and 6d represent a first method of fabricating the device;

FIGS. 7a, 7b, and 7c represent a second method of fabricating the device;

FIG. 8 is a perspective view of the device according to one variant embodiment.

In the following, a wide neck aneurysm is an aneurysm for which the aneurysm height to neck width ratio is greater than 1.5. The aneurysm height is the distance H that separates a point P1 located at the vertex of the aneurysm and a point P2 at the entry to the aneurysm. The neck width is the distance L that separates the lateral edges at the entry to the aneurysm.

Figure 1:
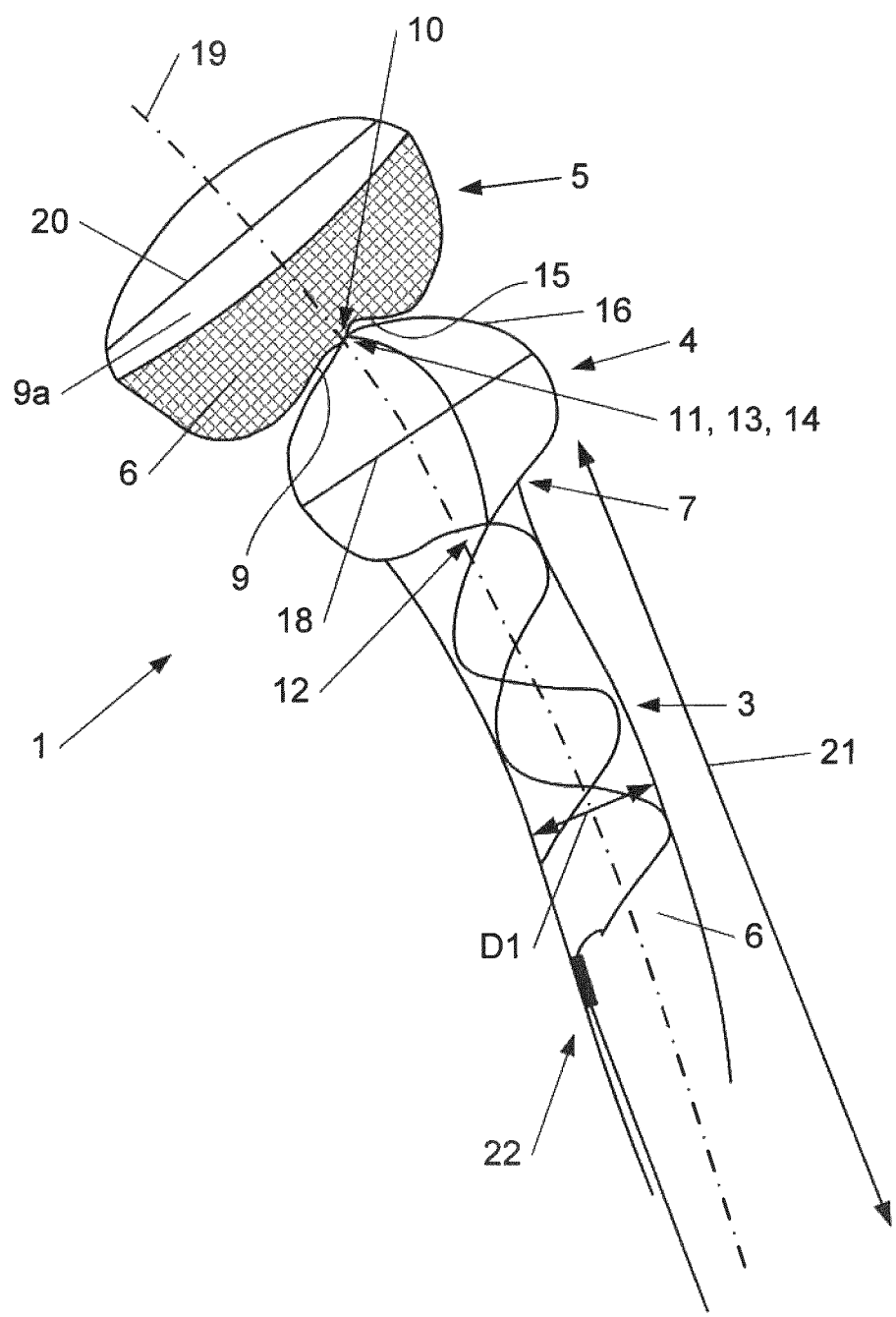
FIG. 1 is a two-dimensional view of a treatment device according to the invention.

FIG. 1 shows an intra-aneurysmal device 1. The intra-aneurysmal device 1 is designed for the treatment of an aneurysm 2. This device 1 is designed for an endovascular treatment. It can be used for any type of wide neck or other aneurysm 2. This device 1 can also be used to treat aneurysms 2 regardless of which part of the body is affected.

In the embodiment shown in FIG. 1, the device 1 comprises a stent 3, an intermediate portion 4 and a head 5 in the form of a dome. The intermediate portion 4 is located between the stent 3 and the head 5.

The stent 3, the intermediate portion 4 and the head 5 are advantageously fabricated using at least one wire.

The stent 3, the intermediate portion 4 and the head 5 are advantageously fabricated using a plurality of wires 6, preferably made of nitinol. Nitinol has interesting mechanical properties, namely shape memory and its elasticity. Furthermore, nitinol is biocompatible and has a super-elastic mechanical behaviour.

Advantageously, at least one wire is radio-opaque. This makes it possible to display the wire on a screen during the operation, so that the open state of the device 1 can also be observed.

The wires 6 are arranged relative to each other so as to form a mesh. The stent 3 is in the form of a meshed flexible tube.

The section of the stent 3 is advantageously approximately circular. However, it should be noted that the characteristics of the stent 3 are such that the stent is flexible. Thus, the shape of the section can vary depending on whether or not a force is applied around the stent 3. The stent can thus adapt to the shape of the artery.

At rest, in other words, when no pressure is applied around the device 1, the section of the stent 3 is consequently advantageously circular and has a diameter D1.

The intermediate portion 4 extends from an upper end 7 of the stent 3. The mesh of the intermediate portion 4 is advantageously identical to the mesh of the stent 3. The number of wires in the intermediate portion 4 is advantageously identical to the number in the stent 3. For example, the stent 3 and the intermediate portion 4 may each be formed from four to thirty-two nitinol wires 6 depending on the size of the implant. The number of wires 6 can vary depending on the size of the implant. This number of wires makes it possible to obtain a large mesh to avoid blocking the blood flow in the source artery, and blood can also flow freely through the intermediate portion 4 and through the stent 3. Consequently, the risk of formation of blood clot caused by a foreign body (the device 1) is reduced.

Figure 2:
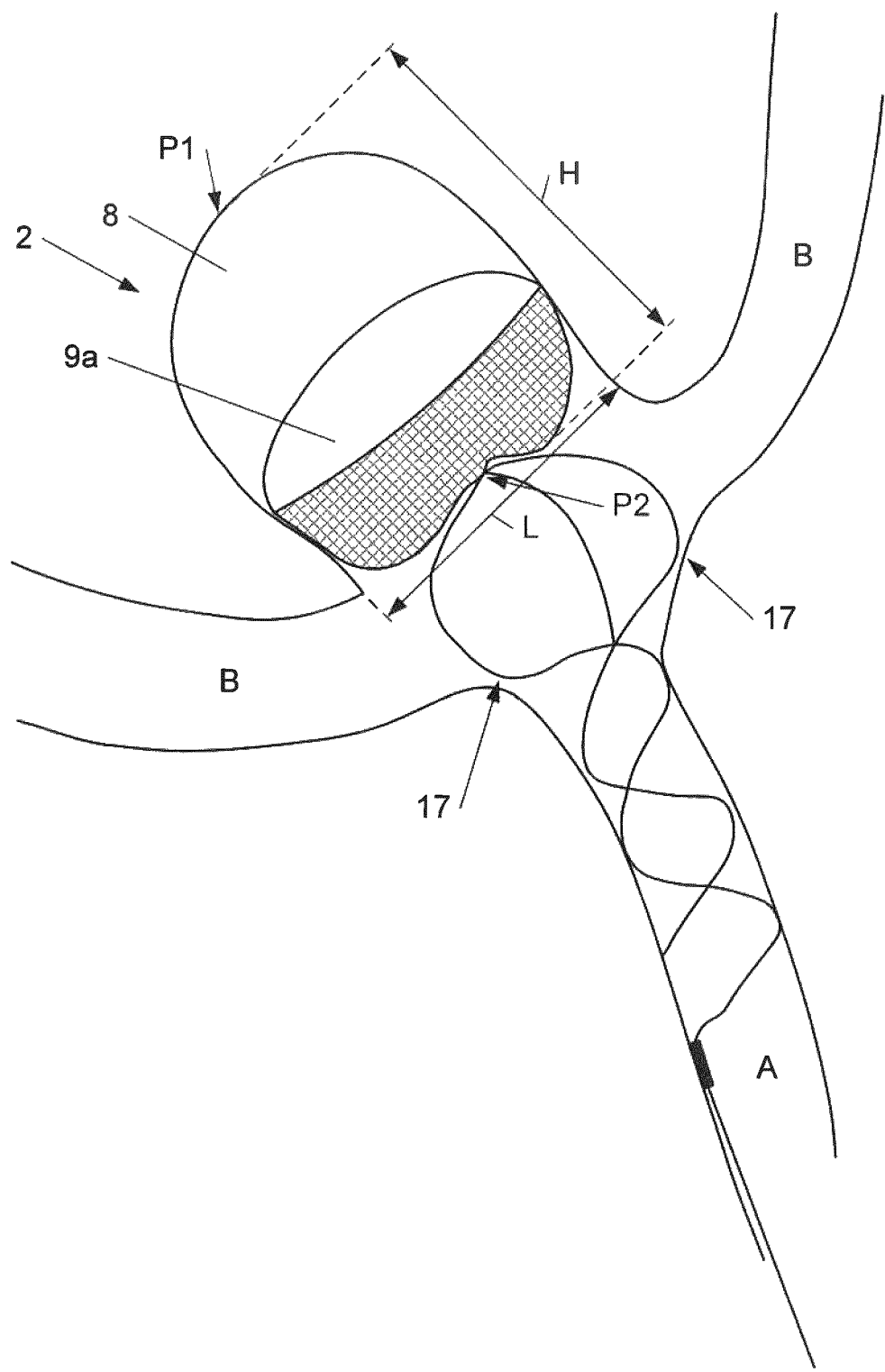
FIG. 2 is a two-dimensional view of the device in FIG. 1, when the device is installed in an aneurysm in the vicinity of an arterial bifurcation.

The head 5 extends from the intermediate portion 4. It is in the form of a concave dome, in which the concave part 9a faces outwards. Once the device 1 has been installed on a patient, the concave part 9a faces the aneurysmal sac 8 as illustrated in FIG. 2.

Like the stent 3 and the intermediate portion 4, the mesh of the head 5 is made of wires 6, preferably nitinol wires. Nevertheless, unlike the stent 3 and the intermediate portion 4, a larger number of wires 6 is used. Alternatively, finer braiding can be made. Between thirty-two and two hundred wires are used in the mesh of the head 5. Thus, the mesh in the head 5 is a fine mesh, finer than the mesh of the stent 3 and the intermediate portion 4, which can considerably reduce the blood flow to the aneurysmal sac 8 without completely sealing it and isolating it from the artery. In this way, blood circulation in the aneurysmal sac 8 reduces and blood progressively stagnates in said aneurysmal sac 8 to induce a fast thrombosis. This advantageously helps to avoid the use of coils.

In one embodiment, the head 5 comprises between four and thirty-two wires, like the stent and the intermediate portion. In this embodiment, the wires of the head form an angle with a longitudinal axis 19 of the device 1 equal to less than the angle formed by the wires of the stent and the intermediate portion. For example, the wires of the stent and the intermediate portion form an angle with the longitudinal axis 19 equal to about 50° and the wires of the head form an angle with the longitudinal axis 19 equal to about 140°. This can advantageously result in the same number of wires regardless of the portion of the device, while assuring that the head performs the function of diverting the blood flow.

The head 5 is locally concave 9 around a centre 10 of the dome, the concave part 9 facing the intermediate portion 4. This concave part 9 is particularly useful in that the head 5 has a rounded shape facing the inside of the aneurysmal sac 8 such that it does not extend or extends only slightly in an artery. Due to its characteristics (fine mesh), the head 5 can hinder blood flow in the artery. The concave part 9 located around the centre 10 of the head 5 means that the head does not hinder blood circulation in the artery, thus reducing intra-luminal curvature. In other words, the objective is to limit or avoid the presence of the head 5 in the artery to avoid reducing the section of the artery. A head 5 that extends in the artery could cause fast aggregation of platelets, and potentially the formation of blood clot in the source artery or in the arterial bifurcation.

The intermediate portion 4 is in the form of an ellipsoid. In this application, the expression "ellipsoid" is not identical to the universally known mathematical definition. The term "ellipsoid" denotes an ellipsoid shape in three dimensions. An ellipse as defined mathematically has a closed contour. Nevertheless, the intermediate portion 4, even though it visually resembles an ellipsoidal shape, does not have a closed contour, particularly in the vicinity of a proximal end 12. In the vicinity of its proximal end 12, the intermediate portion 4 is open on the stent 3 such that the internal volume defined by the intermediate portion communicates with the internal volume defined by the stent 3. In other words, the intermediate portion 4 is continuous with the stent 3 and prolongs it.

In one variant embodiment not shown on the figures, the intermediate portion 4 and the stent 3 are connected by a node.

A node is a zone of the device in which the wires are braided, pinched or held in place by a ring so as to significantly reduce the diameter of the device at this location.

A distal end 11 of the intermediate portion 4 is connected to the head 5 using a node 14 in the vicinity of a junction 13 between said head 5 and said intermediate portion 4. In the following, the connection between the intermediate portion 4 and the head 5 will be called "nodal link".

The nodal link advantageously enables the head 5 to move freely relative to the intermediate portion 4 and globally relative to the remainder of the stent 3. This enables the device 1 to adapt to all anatomies because the head 5 can thus be on an axis different from a longitudinal axis 19 of the device 1. An aneurysm 2 that is not on the axis of an artery through which the device 1 passes can consequently be treated due to mobility of the head 5 that is made possible as a result of the nodal link described above.

In one preferred embodiment represented on the figures, the intermediate portion 4 has an ellipsoid shape that approaches a spheroid. Note that a sphere is a special case of an ellipsoid.

As explained above, in the case of a wide neck aneurysm 2, there is no support zone to correctly stabilise the head 5 in the aneurysmal sac 8. The intermediate portion 4 that is ellipsoidal in shape, jointly with the stent 3, advantageously solves this stability problem.

Advantageously, the shape of an external wall 15 of the head 5 facing the intermediate portion 4 substantially corresponds to a counter-imprint of an upper wall 16 of said intermediate portion 4. This enables a harmonious contact between the head 5 and the intermediate portion 4, if there should be any contact between these two elements. The term "harmonious" indicates that the shape of the external wall 15 is such that the head 5 can rest on the intermediate portion 4, that can thus possibly act as a support for the head 5.

With reference to FIG. 2, the device 1 is inserted in a wide neck aneurysm 2. More precisely, the head 5 is inserted inside the aneurysmal sac 8. When the head 5 is extended, its walls bear on the walls of the aneurysmal sac 8 that confers its initial stability conditions on the device 1. Long term stability of the device 1 is achieved as described later.

As can be seen in FIG. 2, the intermediate portion 4 is located at a bifurcation between a main artery A and two secondary arteries B. The intermediate portion 4 bears on the walls of the artery A. For example, the intermediate portion 4 bears on two support points 17. As for the stent 3, the intermediate portion 4 will be subjected to the endothelialisation phenomenon that can fix it onto the wall of the arteries. The intermediate portion 4 and the stent 3 thus jointly provide better long-term stability than existing devices.

Advantageously, a transverse diameter 18 of the intermediate portion 4 is larger than a diameter D1 of the stent 3. The transverse diameter 18 of the intermediate portion 4 aims at the width of the intermediate portion along a direction transverse to a longitudinal axis 19 of the device 1, in other words approximately perpendicular to said longitudinal axis 19. This gives better stability for the intermediate portion 4.

In one embodiment suitable for the treatment of a cerebral aneurysm, the head 5 is dome-shaped in which the largest diameter 20 is generally between 4 and 13 mm. The diameter D1 of the stent 3 may for example be between 2.5 and 4 mm and its length 21 may be between 15 and 25 mm. The intermediate portion 4 comprises a transverse diameter 18 equal to about 4-5 mm. However, these values are variable and depend mainly on the location of the aneurysm to be treated. An aneurysm located in the brain does not have the same dimensions as an aneurysm located in another part of the body.

The device 1 comprises an electrolytic detachment system that detaches the device 1 once it has been put into place in the aneurysm. In the embodiment represented on the figures, the detachment system is located at one end 22 of the stent 3.

Figure 3:
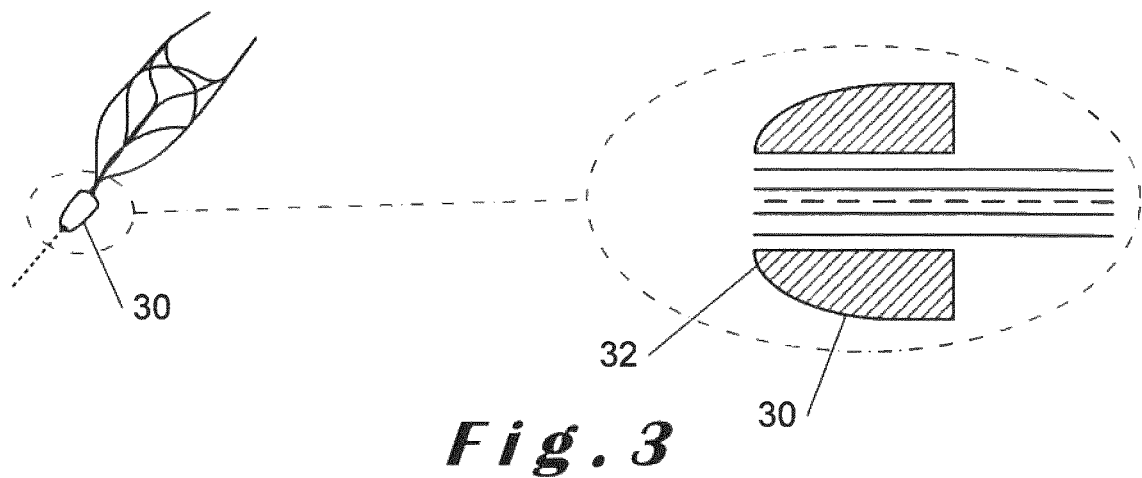
FIG. 3 is a sectional view of a first ring.

The device 1 comprises an annular ring 30 that can be seen in section in FIG. 3 and in perspective in FIG. 4. The annular ring 30 is located on the stent. In particular, the annular ring 30 is located at one end of the stent 3. The annular ring 30 is fabricated from a radio-opaque material, for example such as titanium or platinum. The annular ring 30 brings together all the wires forming the device so as to contain all said wires if necessary, for example so as to reposition the device 1.

The ring 30 is in the form of an annular body comprising a rounded edge 32. The rounded edge is located in the vicinity of the end of the stent 3. The rounded edge 32 facilitates retraction of the device by means of a cylindrical shaped catheter 33. In order to retract the device 1, edges of the catheter stop on the rounded edge 32 of the annular ring 30, that enters the catheter progressively. This makes it easier to retract the device 1 to reposition it, to replace it or to remove it, provided that the endothelialisation phenomenon does not prevent it.

Advantageously, an outside diameter D2 of the annular ring 30 is between 150 and 250 μm and is preferably about 200 μm. This value advantageously facilitates handling of the device 1 in a 0.5 mm diameter catheter. In any case, the ring diameter is less than the diameter of the handling catheter.

In one variant embodiment, the device 1 comprises a second annular ring 31 identical to the ring 30. The second ring 31 is located between the head 5 and the intermediate portion 4. The second annular ring 31 acts firstly as a marker to help the surgeon position the device in the aneurysm and secondly enables better attachment close to the node. As a marker, the surgeon can use it to position the device precisely in that the second annular ring is positioned in the vicinity of the neck of the aneurysm. The second annular ring 31 is superposed on the node, while keeping head 5 perfectly mobile relative to the intermediate portion 4.

The second ring 31 is used to position the head in the aneurysm precisely, this ring being easily identified by the practitioner. The second ring 31 informs the practitioner of the boundary between the head 5 and the intermediate portion 4.

The rings 30, 31 are fixed to said device, so that the rings cannot move relative to the device 1. The rings 30, 31 are fixed on the device 1 by crimping. Crimping is a mechanical process involving plastic deformation to fix it on the device 1.

The device 1 described above has several advantages. Thus, a first advantage of this device is that it can be adapted to any type of aneurysm and particularly aneurysms with a wide neck. A second advantage is that it can be used to treat aneurysms without the addition of supplementary equipment (coils). A third advantage is that the device is stable regardless of the shape of the aneurysm and more particularly when the aneurysm neck is wide. A fourth advantage is that the device is also particularly stable when it is used to treat an aneurysm located close to an arterial bifurcation. A fifth advantage of the device is its stable anchorage that remains efficient in the long term. A sixth advantage is that the device is ergonomic for the practitioner. In particular, the device is designed to be delivered by a micro-catheter with a small outside diameter giving easier access to the most distant aneurysms without the addition of any supplementary material. Placement time is thus shortened. Finally, radio-opaque markers (wires and/or rings) enable real time display of the correct position of the device.

Several methods of fabrication of the device 1 are described below.

According to a first method of fabricating the device illustrated in FIGS. 6a, 6b, 6c and 6d, the method includes a first step 61 in which a first stent 65 with a first mesh size is inserted partly in a second stent 66 with a second mesh finer than the first mesh, so as to form a portion 67 with a large mesh with the same mesh size as the first stent 65 and a portion 68 with a fine mesh, the mesh size of which is the superposition of the first and the second stent 65, 66. In a second step 62, a node 14 is formed in the portion 68 with a fine mesh. The node 14 is positioned such that there is a fine zone 69, 70 on each side of the node. The node 14 is a separation between the intermediate portion 4 and the head 5. In a third step 63, the second stent 68 that is located on the intermediate portion 4 and that with the first stent 67 forms the fine zone 69, is retracted along the direction of the arrows A" towards the head 5 so as not to leave anything in the intermediate portion 4 other than the first stent 65. Thus, the mesh of the intermediate portion is the same as the mesh of the first stent 65. The mesh of the head 5 comprises three layers, namely a first layer of the first stent 65, a second layer of the second stent 66 and a third layer of the second stent 66 that corresponds to the retracted portion in the third step 63. In a fourth step 64, a forming rod B" comprising an ellipsoid shaped end to form the intermediate portion 4 is inserted in the first stent 65 until it stops on node 14 and a forming element C for which the curve is a corresponding impression of a dome and is inserted in the second stent 68 stopping in contact on node 14. All these elements are inserted in a mould D for which the moulding cavity defines a tubular portion and an ellipsoid portion and a dome-shaped portion. In a fifth step, the mould is heated so as to heat seal the final device.

According to a second method of fabricating the device illustrated in FIGS. 7a, 7b and 7c, the device comprises a first step in which a first rod B' comprising an ellipsoid-shaped end is inserted in a stent 74. The stent 74 comprises a large mesh part 75 and a small mesh part 75. The first rod B' is inserted until the end is adjacent to the small mesh portion 75. In a second step 73, a dome-shaped forming element is inserted in the fine mesh part 75 of the stent. In this step, the stent 74 and the elements A', C' are inserted in a mould D'. The assembly is then heated in the mould D' to heat seal the final device. The node 14 is fabricated in mould D' by heat sealing and due to the particular shape of the mould that enables local narrowing of the diameter of the device.

The dome may have a complex geometry, to optimise diversion of the blood flow FIG. 8 illustrates a geometry of the dome capable of interrupting the blood flow. The density of the mesh of the head in the form of a flower is advantageously capable of efficiently diverting the blood flow. The flower shape is obtained by retracting the portion 69 several times inside the head 5.

In order to satisfy an industrial need, the moulds used for the first and second methods can be in the form of a handle of variable section in which several devices can be fabricated simultaneously.

Naturally a person competent in the field of the invention can make modifications to the description given above, to satisfy special needs.

The invention claimed is:

1. An intra-aneurysmal device for the treatment of an aneurysm, the device comprising:
   a stent with a circular section with a diameter, the stent being suitable for and designed to anchor the device in an artery,
   a head designed to be inserted in the aneurysm, the head being capable of significantly reducing blood flow in the aneurysm,
   an intermediate portion located between the head and the stent, and connecting the head to the stent, the intermediate portion being in a form of an ellipsoid, of which a distal end is connected to the head and a proximal end is connected to the stent, a transverse diameter of the intermediate portion is larger than the diameter of the stent, the transverse diameter being approximately perpendicular to a longitudinal axis of the device,
   wherein the head is made of at least one wire forming a mesh and wherein the intermediate portion and the head are only connected by a node made by at least two wires braided to one another at the node such that the diameter of the node is reduced, so that the head is free to move relative to the intermediate portion, and wherein said head includes an external wall facing an upper wall of said intermediate portion and wherein said external wall is a counter-imprint of said upper wall and said external wall comprises a locally concave portion around a center of the head adjacent said distal end, said concave portion facing the upper wall of said intermediate portion, allowing thereby said head to rest on said intermediate portion.

2. The device according to claim 1, wherein the head is dome-shaped.

3. The device according to claim 1, wherein the intermediate portion continuously prolongs the stent.

4. The device according to claim 1, wherein the head is composed of at least one wire forming a mesh, the mesh being able and designed to divert at least a part of the blood flow.

5. The device according to claim 4, wherein the head comprises between eight and two hundred wires.

6. The device according to claim 4, wherein the at least one wire is made of a biocompatible material.

7. The device according to claim 4, wherein the at least one wire is radio-opaque.

8. The device according to claim 4, wherein the head comprises between thirty-two and two hundred wires.

9. The device according to claim 4, wherein the at least one wire is made of nitinol, platinum or titanium.

10. The device according to claim 1, wherein the stent and/or the intermediate portion are made using at least one wire forming a mesh that enables blood flow through the stent and the intermediate portion.

11. The device according to claim 1, wherein the device comprises an annular ring located on one end of the stent.

12. The device according to claim 11, wherein the device comprises a second annular ring located between the head and the intermediate portion.

13. The device according to claim 12, wherein the first annular ring and the second annular ring are made from a radio-opaque material.

14. The device according to claim 12, wherein the first and second annular rings are fixed by crimping.

* * * * *